US006715475B2

(12) United States Patent
Cook

(10) Patent No.: US 6,715,475 B2
(45) Date of Patent: Apr. 6, 2004

(54) EXHAUST GAS RECIRCULATION VALVE

(75) Inventor: John Cook, Chatham (CA)

(73) Assignee: Siemens VDO Automotive, Incorporated (CA)

( * ) Notice: Subject to any disclaimer, the term of this patent is extended or adjusted under 35 U.S.C. 154(b) by 0 days.

(21) Appl. No.: 10/281,281

(22) Filed: Oct. 28, 2002

(65) Prior Publication Data

US 2003/0089351 A1 May 15, 2003

Related U.S. Application Data

(60) Provisional application No. 60/345,348, filed on Oct. 26, 2001.

(51) Int. Cl.[7] ........................ F02M 25/07; F16K 31/02; H01F 7/06

(52) U.S. Cl. ............................ 123/568.21; 251/129.15; 251/65; 29/602.1

(58) Field of Search ....................... 123/568.11, 568.21, 123/568.25, 568.26, 568.27; 251/65, 129.15, 129.17; 335/219, 250, 262, 296, 302; 29/729, 592.1, 602.1, 606, 607

(56) References Cited

U.S. PATENT DOCUMENTS

| | | | | | |
|---|---|---|---|---|---|
| 4,164,918 | A | | 8/1979 | Haka | 123/568.27 |
| 4,906,880 | A | * | 3/1990 | Miura | 251/129.15 |
| 5,094,218 | A | | 3/1992 | Everingham et al. | 123/568.26 |
| 5,897,096 | A | * | 4/1999 | Nakano | 251/65 |
| 6,129,115 | A | * | 10/2000 | Janssen et al. | 251/129.15 |
| 6,178,956 | B1 | | 1/2001 | Steinmann et al. | 123/568.21 |
| 6,217,001 | B1 | | 4/2001 | Gluchowski et al. | 251/129.07 |
| 6,435,168 | B1 | | 8/2002 | Bircann et al. | 123/568.21 |
| 6,460,521 | B1 | * | 10/2002 | Modien | 123/568.21 |
| 6,474,320 | B1 | * | 11/2002 | Modien | 123/568.21 |
| 6,546,945 | B2 | * | 4/2003 | Ishigaki et al. | 251/129.15 |
| 2001/0032631 | A1 | * | 10/2001 | Cook et al. | 123/568.21 |
| 2002/0189600 | A1 | * | 12/2002 | Nydam | 123/568.21 |
| 2003/0030020 | A1 | * | 2/2003 | Fukano | 251/129.17 |

* cited by examiner

*Primary Examiner*—Willis R. Wolfe

(57) ABSTRACT

An exhaust gas recirculation EGR valve is provided. The exhaust gas recirculation valve has a housing, a closure member, and an electrical actuator. The electrical actuator includes a first core, a magnetic member, a second core, and a bobbin assembly supporting a coil aligned along the longitudinal axis. The bobbin assembly is coupled to the closure member. The bobbin assembly, including the coil, is movable within a generally toroidal volume. A force balance closure assembly is coupled to the coil assembly. Methods of actuating an EGR valve and of assembling a bobbin assembly are also described.

34 Claims, 3 Drawing Sheets

FIG. 3
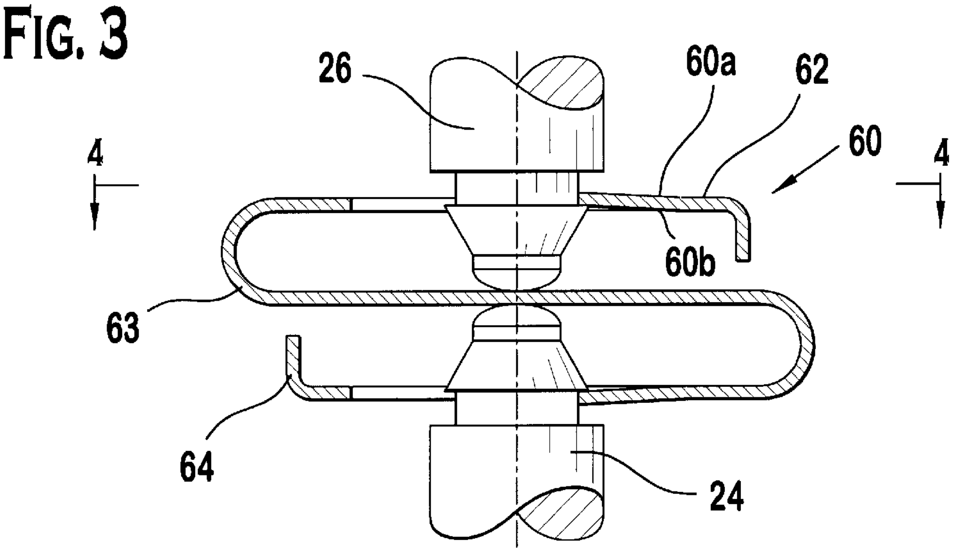
FIG. 4
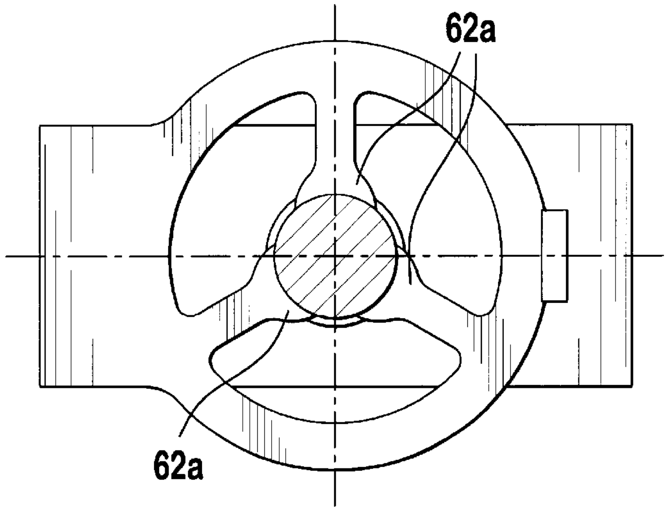
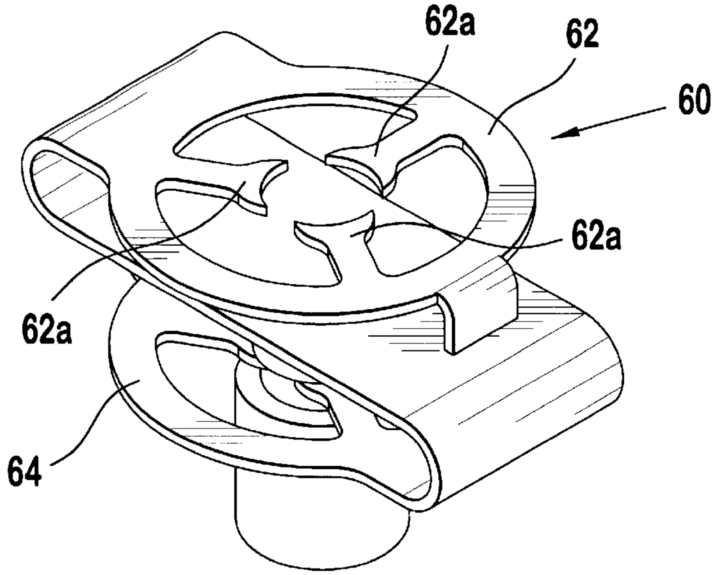
FIG. 5

EXHAUST GAS RECIRCULATION VALVE

PRIORITY

This application claims the benefits of U.S. Provisional Application Ser. No. 60/345,348 entitled "Electrically Actuated Exhaust Gas Recirculation Valve" by John Cook and filed on Oct. 26, 2001, which provisional application is hereby incorporated by reference in its entirety.

BACKGROUND OF THE INVENTION

Controlled engine exhaust gas recirculation ("EGR") is a known technique for reducing oxides of nitrogen in products of combustion that are exhausted from an internal combustion engine to atmosphere. A known EGR system comprises an EGR valve that is controlled in accordance with engine operating conditions to regulate the amount of engine exhaust gas that is recirculated to the induction fuel-air flow entering the engine for combustion so as to limit the combustion temperature and hence reduce the formation of oxides of nitrogen.

It is known to mount an EGR valve on an engine manifold where the valve is subjected to a harsh operating environment that includes wide temperature extremes and vibrations. Stringent demands are imposed by governmental regulation of exhaust emissions that have created a need for improved control of such valves. Use of an electric actuator is one means for obtaining improved control, but in order to be commercially successful, such an actuator must be able to operate properly in such extreme environments for an extended period of usage. Moreover, in mass-production automotive vehicle applications, component cost-effectiveness and size may be significant considerations.

A known EGR valve typically relies on a valve that is actuated by a movement of a valve stem by an electromagnetic actuator. The EGR valve is typically mounted to a manifold or a housing that has one port exposed to exhaust gases and another port exposed to an intake manifold of the engine. Under certain operating conditions, the valve abuts a valve seat surface so as to prevent exhaust gases from flowing into the intake manifold. Depending on the operating conditions, the valve can be moved away from the seat to permit a controlled amount of exhaust gases into the intake manifold.

An EGR valve that possesses more accurate, quicker and generally linear response can be advantageous by providing improved control of tailpipe emissions, improved driveability, and/or improved fuel economy for a vehicle having an internal combustion engine that is equipped with an EGR system.

Further, a valve that is more compact in size while delivering the same or an increased magnitude of force over the travel of the valve stroke can be advantageous because of limitations on available space in a vehicle engine compartment. Thus, it would be advantageous to provide for an EGR valve that is compact yet powerful enough to deliver a generally constant force over an extended stroke distance.

SUMMARY OF THE INVENTION

In one preferred embodiment of the invention, an exhaust gas recirculation valve is provided. The exhaust gas recirculation valve includes a housing, a closure member, and an electrical actuator. The housing has a first port in fluid communication with a second port. The closure member is disposed in the housing in one position along a longitudinal axis to occlude fluid communication between the first port and the second port. The closure member is located in one of a plurality of positions that permits fluid communication between the first port and the second port. The closure member is coupled to an elongated member of the electrical actuator. The electrical actuator is coupled to the housing. The actuator includes an inner core, magnetic member, outer core, bushing, and bobbin assembly. The inner core has a first opening disposed about the longitudinal axis. The magnetic member is disposed adjacent the inner core. The magnetic member has a second opening disposed about the longitudinal axis. The outer core is generally coaxial with respect to the inner core. The outer core extends along the longitudinal axis and surrounds the inner core and the magnetic member so as to form a generally toroidal interior volume. The outer core includes a third opening disposed about the longitudinal axis. The bushing is coupled to the inner core, the magnetic member and the outer core along the longitudinal axis. The bushing supports an elongated member. The bobbin assembly is coupled to the elongated member and supports a coil, the coil being disposed in the generally toroidal interior volume so that the coil moves along the longitudinal axis upon energization of the coil.

In another preferred embodiment of the invention, an electrical actuator is provided. The electrical actuator includes a casing, inner core, outer core, magnetic member, bushing, and bobbin assembly. The casing has a first casing end spaced from a second end along a longitudinal axis. The inner core is disposed proximate the first casing end. The inner core has a first circumferential surface disposed about the longitudinal axis. The inner core includes a first opening disposed about the longitudinal axis. The magnetic member is located proximate to the inner core. The magnetic member has a second circumferential surface disposed about the longitudinal axis and circumferentially aligned with the first circumferential surface so as to provide a generally continuous surface. The magnetic member includes a second opening disposed about the longitudinal axis. The outer core is generally coaxial with respect to the inner core. The outer core extends along the longitudinal axis and surrounds the first and second circumferential surface so as to form a generally toroidal interior volume. The outer core includes a third opening disposed about the longitudinal axis. The bushing is coupled to the inner core, the magnetic member and the outer core along the longitudinal axis. The bushing supports and guides an elongated member for movement along the longitudinal axis. The bobbin assembly is coupled to the elongated member and supports a coil. The coil is disposed in the generally toroidal interior volume so that the coil moves through a portion of the interior volume along the longitudinal axis upon energization of the coil.

In yet another embodiment of the invention, an exhaust gas recirculation valve is provided. The exhaust gas recirculation valve includes a housing, electrical actuator, and a force balance closure assembly. The housing has a first port with a seat surface in fluid communication with a second port. The housing includes an annular chamber disposed about a longitudinal axis and surrounds a hub portion coaxial to the longitudinal axis. The first port is adapted to fluidly communicate with a port of an exhaust manifold of an engine, and the second port is adapted to fluidly communicate with a port of an intake manifold of the engine. The force balance closure assembly being disposed in the housing and includes a closure member, valve stem, head and annular seal. The closure member is disposed in one position along a longitudinal axis to occlude fluid communication between the first port and the second port. The closure member is movable to one of a plurality of positions permitting fluid communication therebetween the ports. The stem extends through the hub of the housing along the longitudinal axis so as to couple to the electrical actuator. The head is coupled to the stem. The head has a face portion and a body portion. The face portion includes a sealing surface contiguous to the seat surface of the first port in the one position. The face portion also includes a first face area spaced from a second face area along the longitudinal axis. The first face area is exposed to the first port. The second face area is exposed to the second port. At least one passage extends through the face portion. The body portion has a generally cylindrical body extending about the longitudinal axis from the face portion towards an end portion surrounding the hub and being surrounded by the annular chamber. The body portion forms an interior volume in fluid communication with the annular chamber and the passage. The annular seal is disposed in an annular groove of the end portion about the longitudinal axis. The annular seal has a circumferential surface contiguous to interior wall surface of the annular chamber so that the chamber is generally fluid tight with respect to the second port the end portion and the seal as the valve moves along the longitudinal axis in the chamber.

In yet another preferred embodiment of the invention, a method of operating an exhaust gas recirculation valve is provided. The exhaust gas recirculation valve has a housing, a closure member, and an electrical actuator. The housing includes a first port communicating with an exhaust port of the engine. The first port is in fluid communication with a second port. The closure member is disposed in the housing in a closed position along the longitudinal axis occluding fluid communication between the first port and the second port and one of a plurality of positions permitting fluid communication therebetween. The electrical actuator includes a first core, a magnetic member, a second core, and a bobbin assembly supporting a coil aligned along the longitudinal axis. The bobbin assembly is coupled to the closure member. The method can be achieved, in part, by maintaining the closure member in the closed position upon de-energization of the coil; and moving the bobbin assembly along the longitudinal axis in a volume radially outward of the magnetic member and one of the first and second cores when the coil is energized so as to move the closure member along the longitudinal axis.

In yet another preferred embodiment of the invention, a method of controlling an exhaust gas recirculation valve in an engine is provided. The valve has a housing that includes a first port that communicates with an exhaust port of the engine. The first port is in fluid communication with a second port. A closure member is disposed in the housing in a closed position along a longitudinal axis so as to occlude fluid communication between the first port and the second port, and in one of a plurality of positions that permits fluid communication therebetween. An electrical actuator has a first core, a magnetic member and a second core aligned along the longitudinal axis, and a bobbin assembly that supports a coil. The bobbin assembly is coupled to the closure member. The method can be achieved, in part, by maintaining the closure member in the closed position upon de-energizing the coil, and moving the bobbin assembly in a volume radially inward of one of the first and second cores and radially outward of the magnetic member and the other of the first and second cores along the longitudinal axis.

In yet another embodiment of the invention, a method of assembling a bobbin assembly to an electromagnetic actuator is provided. The electromagnetic actuator includes an outer core, magnetic member and inner core with a bobbin assembly. The electromagnetic actuator has an outer core surrounding both an inner core and a magnetic member about a longitudinal axis so as to provide a generally toroidal interior volume. The bobbin assembly has a generally cylindrical portion integral to a generally planar portion. The coil is mounted to the cylindrical portion. A bushing is coupled to the inner core, the magnetic member and the outer core along the longitudinal axis. The bushing supports and guides an elongated member. The method can be achieved, in part, by inserting a locating plate with a hub portion over the elongated member; and sandwiching the generally planar portion of the bobbin assembly to the locating plate with a retaining assembly along the longitudinal axis so that the bobbin assembly is aligned to the longitudinal axis relative to the outer core.

BRIEF DESCRIPTION OF THE DRAWINGS

The accompanying drawings, which are incorporated herein and constitute part of this specification, illustrate embodiments of the invention, and, together with the general description given above and the detailed description given below, serve to explain the features of the invention.

FIG. 3 illustrates a sectional view of a coupling usable with the EGR valve of FIG. 1.

FIG. 4 illustrates a top down sectional view of the retaining prongs of the coupling of FIG. 3.

FIG. 5 illustrates a perspective view of the coupling device of the EGR valve of FIG. 1.

DETAILED DESCRIPTION OF THE PREFERRED EMBODIMENT(S)

Figure 1:
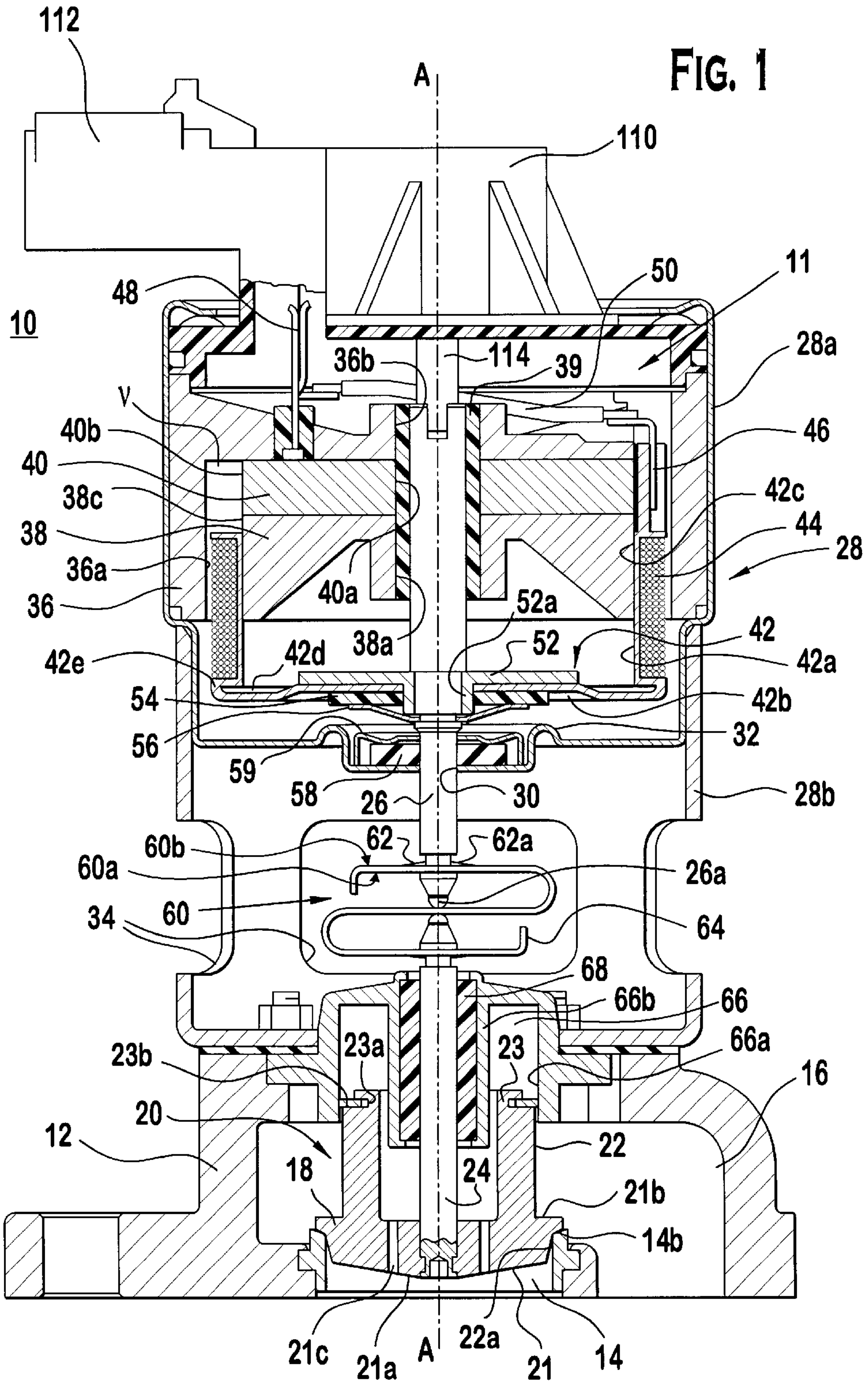
FIG. 1 illustrates an EGR valve with a force balance feature according to a preferred embodiment.

FIGS. 1-5 illustrate the preferred embodiments. In particular, FIG. 1 illustrates an exhaust gas recirculation valve 10. The EGR valve 10 has a housing 12 connected to an actuator casing 28 that encloses an electrical actuator 11 and provides electrical connections for the electrical actuator 11 and a position sensor 110. The housing 12 can be connected to a port of an exhaust manifold and a port of an intake manifold (not shown).

The housing 12 has a first port 14 in fluid communication with a second port 16 so that exhaust gas from the exhaust manifold of an engine (not shown) can be communicated to the second port 16 and thereon to the intake manifold of the engine (not shown). In a preferred embodiment, the housing 12 is integrally formed as part of an engine intake and exhaust manifold.

A closure member 18 is disposed in the housing 12 in one position along a longitudinal axis A—A. The closure member 18 includes a head 20, which is provided with a sealing surface **22*a* generally oblique to the longitudinal axis A—A. The sealing surface 22a, in a closed position of the EGR valve, rests on a generally complementary surface 14*b* of the first port 14 so as to occlude fluid communication between the first port 14 and the second port 16. The head 20 is movable along the longitudinal axis A—A between the closed position and one of a plurality of positions that permits fluid communication between the first port 14 and the second port 16. The head 20 is connected to a valve stem 24 by a suitable coupling such as, for example, a threaded fastener, rivet or weld, although the valve stem 24 is preferably formed as a single integrated unit with the head 20. The valve stem 24 can be coupled to an elongated member 26 of the electrical actuator 11**.

The electrical actuator 11 is coupled to the housing 12 via the electrical actuator casing 28. The electrical actuator casing 28 can be formed as a single integrated unit or as a multi-piece casing. Preferably, the electrical actuator casing 28 is formed by a two-piece casing. A first casing 28*a* can be formed by a suitable technique such that one end of the casing 28*a* is open at one end to permit installation of the electrical actuator 11. The other end of the first casing 28*a* is closed except for an actuator aperture 30 to allow the elongated member 26 of the electrical actuator 11 to extend therethrough. The electrical actuator aperture 30 can be formed in a pocketed section 32 of the end wall of the casing 28*a*. A second casing 28*b* can be formed with opposed openings to permit the first casing 28*a* to be connected to the second casing 28*b* at one end and the housing 12 to be connected to the second casing 28*b* at the other end of the casing 28*b*. Preferably, the second casing 28*b* is formed with suitably sized apertures 34 disposed about the cylindrical wall surface of the second casing 28*b*. The apertures 34 allow for installing and removing of a connection between the elongated member 26 and the valve stem 24. The apertures 34 also allow for air cooling, minimizing heat transfer, and a visual indication of the operability of the electrical actuator 11.

The electrical actuator 11 has an outer core 36 surrounding a magnetic member 40 and an inner core 38. The inner core 38 has a first opening 38*a* disposed about the longitudinal axis A—A with a first outer circumferential surface 38*c* that forms a preferably continuous right cylinder wall surface. The magnetic member 40 is disposed adjacent the inner core 38. The magnetic member 40 has a second opening 40*a* disposed about the longitudinal axis A—A with a second outer circumferential surface 40*b* that forms a preferably continuous right cylinder wall surface. Preferably, the first and second outer circumferential surfaces 38*c* and 40*b* are axially aligned such that they form a generally continuous right cylinder wall surface when the magnetic member 40 is assembled contiguously to the inner core 38. And as used herein, the term "core" indicates that it can be any component that completes a magnetic circuit such as, for example, a ferromagnetic core.

The outer core 36 is generally coaxial to both the magnetic member 40 and the inner core 38 so as to surround both about the longitudinal axis A—A in a nested configuration. The outer core 36 has a preferably right cylinder inner surface 36*a* that is spaced from the first and second outer circumferential surfaces of the respective inner core 38 and magnetic member 40 so as to form an approximately toroidal interior volume V. As used herein the term "approximately" denotes that a value or dimension(s) representing an object can vary between ±30% of its actual value or dimension(s). A bobbin assembly 42, including an electromagnetic coil 44, can be partly or wholly disposed within this generally toroidal interior volume V. The outer core 36 has a third opening 36*b* disposed about the longitudinal axis A—A. The first, second, and third openings are coincident along the longitudinal axis A—A so as to define a passageway on which a bushing 39 can be inserted therein.

The bushing 39 can be coupled to the inner core 38, the magnetic member 40 and the outer core 36 along the longitudinal axis A—A through the first through third openings. The bushing 39 can be used to provide a bearing surface for the elongated member 26 as the elongated member 26 reciprocates along the longitudinal axis A—A. More importantly, the bushing 39 can be used to ensure that elements coupled to the bushing 39 are located concentrically with respect to the longitudinal axis A—A. The elongated member 26 can be fixed to the bobbin assembly 42. Preferably, the bushing 39 can be formed from a sintered graphite bronze.

Proximate the electrical connector 112, a position sensor 110 is provided as part of EGR valve 10. The position sensor 110 is coupled to the elongated member 26 by a follower 114. The follower 114 includes a biasing spring disposed internally in the position sensor 110 that acts to bias the elongated member 26 in a direction along the longitudinal axis A—A which maintains the sealing face 22*a* closed against the seat surface 14*b*. The position sensor 110 is able to follow the position of head 20 in relation to seat 14a and provide a signal representing the position of head 20 via terminals of an electrical connector 112 projecting radially of a main body. This signal may be used by an engine management computer as feedback from the EGR valve 10 for controlling the amount of exhaust gas being recirculated into the intake manifold as determined by the engine management computer. By way of example, the position sensor 110 can be a solid-state sensor a potentiometer.

The bobbin assembly 42 supports an electromagnetic coil 44 by winding a length of wire 46 about the bobbin assembly 42 in any suitable pattern such as, for example, multiple overlaying patterns. The wire 46 is connected at two terminal connector ends 46 that terminate to two terminal ends 48. For clarity, only one terminal connector end 46 and only one terminal end 48 are shown. The terminals are connected to respective electrical connector 112 by suitable electrical connection. Preferably, the electrical connection between each of the terminal ends 48 and each of the terminal connector ends 46 is a flexible insulated and braided wire 50 that allows the coil 44 to reciprocate along the longitudinal axis A—A without binding or biasing the coil 44 throughout its movement. The braided wire 50 is preferably disposed in an arcuate fashion about the longitudinal axis.

As discussed earlier, the bobbin assembly 42 is disposed in the generally toroidal interior volume V so that the coil 44 moves along the longitudinal axis A—A upon energization of the coil 44 in a portion of the generally toroidal volume. The bobbin assembly 42 has a first bobbin support portion 42*a* and a second bobbin support portion 42*b*. The first bobbin support portion 42*a* preferably is a channel surrounding the longitudinal axis and facing radially outward such that the channel wall surface 42*c* is generally parallel to the longitudinal axis A—A. The channel wall surface 42*c* also faces the right cylinder wall surfaces of the inner core 38 and the magnetic member 40. Preferably, the first bobbin support portion 42*a* is spaced from the right cylinder wall surfaces such that a suitable operative working gap is provided therebetween.

The second bobbin support portion 42*b* can be a generally planar shaped member. The second bobbin support portion 42*b* can be affixed to the first bobbin support portion 42*a* at an edge portion 42*e* by a suitable technique. Alternatively, the first and second bobbin support portions can be formed as a single piece member. Preferably, the first and second bobbin support portions are stamped from a sheet of metal alloy such as aluminum or magnesium alloy to form a single piece member. The stamped single piece member 42 can be provided with stiffening ribs 42*d* to enhance the structural stiffness of the member 42*b*. For example, equiangularly spaced stiffening ribs 42*d* can be formed on the generally planar shaped second support portion 42*b*.

The bobbin assembly 42 can be located in a coaxial manner relative to the elongated member 26, outer and inner cores 36,38 and the magnetic member 40 by sandwiching the second bobbin support portion 42*b* between a locating plate 52 and a locating washer 54. The locating plate 52 can be provided with an accurately dimensioned locating plate hub 52*a* that ensures that the locating plate 52 is perpendicular relative to the elongated member 26 or parallel to the longitudinal axis A—A. The locating plate hub 52*a* also ensures that the bobbin is accurately located relative to the outer and inner cores. The locating washer 54 is inserted over the hub 52*a* of the locating plate 52 and is retained against the second bobbin support portion 42*b* by a retaining clip 56. Preferably, the clip 56 is made from spring steel.

To ensure that an interior volume of the electrical actuator 11 is generally sealed from the environmental contaminants, a floating seal bushing 58 can be provided in the pocketed portion 32 of the end wall of the first casing 28*a*. The floating seal bushing 58 can be retained in the pocketed portion 32 by a spring clip 59. Preferably, the floating seal bushing 58 is formed from a carbon or graphite filled bronze bushing.

A coupling 60 is provided to connect the valve stem 24 to the elongated member 26, as shown in FIGS. 1, and 3–5. The coupling 60 permits two-degrees of freedom between the elongated member 26 and the valve stem 24. That is to say, the coupling 60 permits lateral misalignment between the elongated member 26 and the valve stem 24. Although FIG. 1 shows the elongated member 26 and the valve stem 24 as being coincidentally aligned along the longitudinal axis A—A, the coupling 60 facilitates relative lateral displacement and/or relative angular orientation of the respective axes of the elongated member 26 and the valve stem 24. The coupling 60 provides adequate spring force to ensure that movement along the axis of the elongated member 26 is accurately transferred to movement along the axis of the valve stem 24, and vice-versa.

In particular, the coupling 60 has a first surface 60*a* being spaced from a second surface 60*b* and extending between a first coupling end 62 and a second coupling end 64 along the longitudinal axis A—A. The first coupling end 62 is connected to a conical portion 26*a* of the elongated member 26. The second coupling end 64 is connected to a conical portion 24*a* of the valve stem 24. The two coupling ends 62 and 64 are suitably formed with a coupling body 63 sufficiently stiff so that they resist separation along the longitudinal axis A—A. As can be seen in a sectional view of FIG. 4, the first coupling end 62 is generally planar with preferably three prongs 62*a* extending toward the longitudinal axis A—A so as to engage with an annular groove 26*b* adjacent the conical end of the elongated member 26. The second coupling end 64 is configured in the same manner and therefore is not shown. The coupling 60 is connected to the elongated member 26 and the valve stem 24 end as follows. The conical end of either the elongated member 26 or the valve stem 24 is inserted along the longitudinal axis A—A so that the three prongs 62*a* are forced to move along the longitudinal axis so as to spread apart to permit the conical end to extend through. Once the conical end extends through, the annular groove 26*b* allows the three prongs 62*a* to spring back so as to grip the surface of the annular groove 26*b*. It should be noted that the preferred embodiment of the coupling reduces heat being transferred by the valve stem 24 from contact with the elongated member 26.

Returning to FIG. 1, a force balance chamber 66 is provided in the housing 12. The force balance chamber 66 can significantly reduce the spring force required to hold a valve in a closed position. Thus, it is possible to even eliminate a valve closing spring, such as that shown at 70 in FIG. 2, with its attendant large spring force and structural volume to maintain the valve closed.

In particular, as shown in FIG. 1, the head 20 has a face portion 21 and a body portion 22. The face portion 21 has a sealing surface 22*a* contiguously engaging a seat surface 14*b* of the first port 14 in the closed position. The face portion 21 also has a first face area 21*a* spaced from a second face area 21*b* along the longitudinal axis A—A. The first face area 21 is exposed to the first port 14 with a surface area A1. The second face area 21*b* is exposed to the second port 16 with a surface area A2<A1. Extending through the face portion 21 is at least one orifice passage 21*c* (two are shown in FIG. 1). And as used herein, the term "surface area" denotes a surface area generally transverse to the longitudinal axis A—A.

The body portion 22 extends along the longitudinal axis A—A to form a generally cylindrical body portion extending along the longitudinal axis A—A. The body portion 22 extends toward an end portion 23. The body portion 22 has an interior cavity that forms a volume in fluid communication with the at least one orifice passage 21*c*. Proximate the end portion 23, an annular groove 23*a* is provided so that a ring seal 23*b* can be mounted therein. The ring seal 23*b* contacts wall surfaces of a force balance chamber 66 of the housing 12 and presents a third surface area A3 that is approximately equal the first surface area A1. The chamber 66 has interior wall surfaces 66*a* cincturing the end portion 23. The ring seal 23*b* can be configured to bias against the interior wall surfaces 66*a* so that the chamber 66 is generally fluid tight with respect to the second port 16 as the end portion 23 moves along the longitudinal axis A—A in the chamber 66. That is to say, the chamber 66 is generally fluid tight with respect to the second port 16 but remains in communication with the first port 14 through the at least one orifice passage 21*c*.

The chamber 66 has a hub portion 66*b* extending along the longitudinal axis A—A. The valve stem 24 can be coupled to the face portion 21 of the head 20. The valve stem 24 extends through the housing 12 and is configured to reciprocate in a valve stem bushing 68 mounted to the hub 66*b* of the chamber 66. The valve stem bushing 68 is preferably formed as a separate component and located in the hub 66*b*. Alternatively, the valve stem bushing 68 can be formed integrally as part of the chamber 66. When formed integrally, the entire chamber 66 can be cast from graphite-filled sintered metal. When formed separately, the valve stem bushing 68 can also be graphite-filled sintered metal. The chamber 66 can be formed separately or integrally with the housing 12. Preferably, the chamber 66 is formed separately from the housing 12 from stainless steel and the valve stem bushing 68 is formed separately from carbon or graphite-filled sintered metal.

Because the surfaces of the chamber 66 and the face portions of the valve are exposed to combustion gases and particulates, a surface treatment can be applied to the exposed surfaces. The surface treatment can be a suitable surface treatment that resists combustion gases and prevents deposits formation. The surface treatment can be a coating such as, for example, chromium plating, Teflon® coating, vapor deposited coating or other coatings.

According to the embodiment illustrated in FIG. 1, the chamber 66 balances forces acting on the head 20. In engine configurations such as, for example, in two or four-stroke gasoline engines, which can provide intake vacuum at the port 16, the force of the intake vacuum acting on the head 20 can be balanced by the force of the exhaust pressure, via the at least one orifice passage 21*c* and chamber 66, also acting on the head 20. Thus, a weaker closing spring, e.g., the biasing spring of follower 114, can be used to close the EGR valve with the force balance closure chamber 66.

In such engine configurations, if the relative movement of the valve head with respect to the seat are reversed, e.g., such that extension of the actuator moves the valve to an open position, the large amount of vacuum available due to a throttle in the intake manifold permits the vacuum to be used to assist the closing spring at idle and during throttle-closed deceleration. Thus, in such engine configurations, a force balance chamber may not be needed and an even less complex EGR valve such as one exemplarily illustrated in FIG. 2 can be used.

Figure 2:
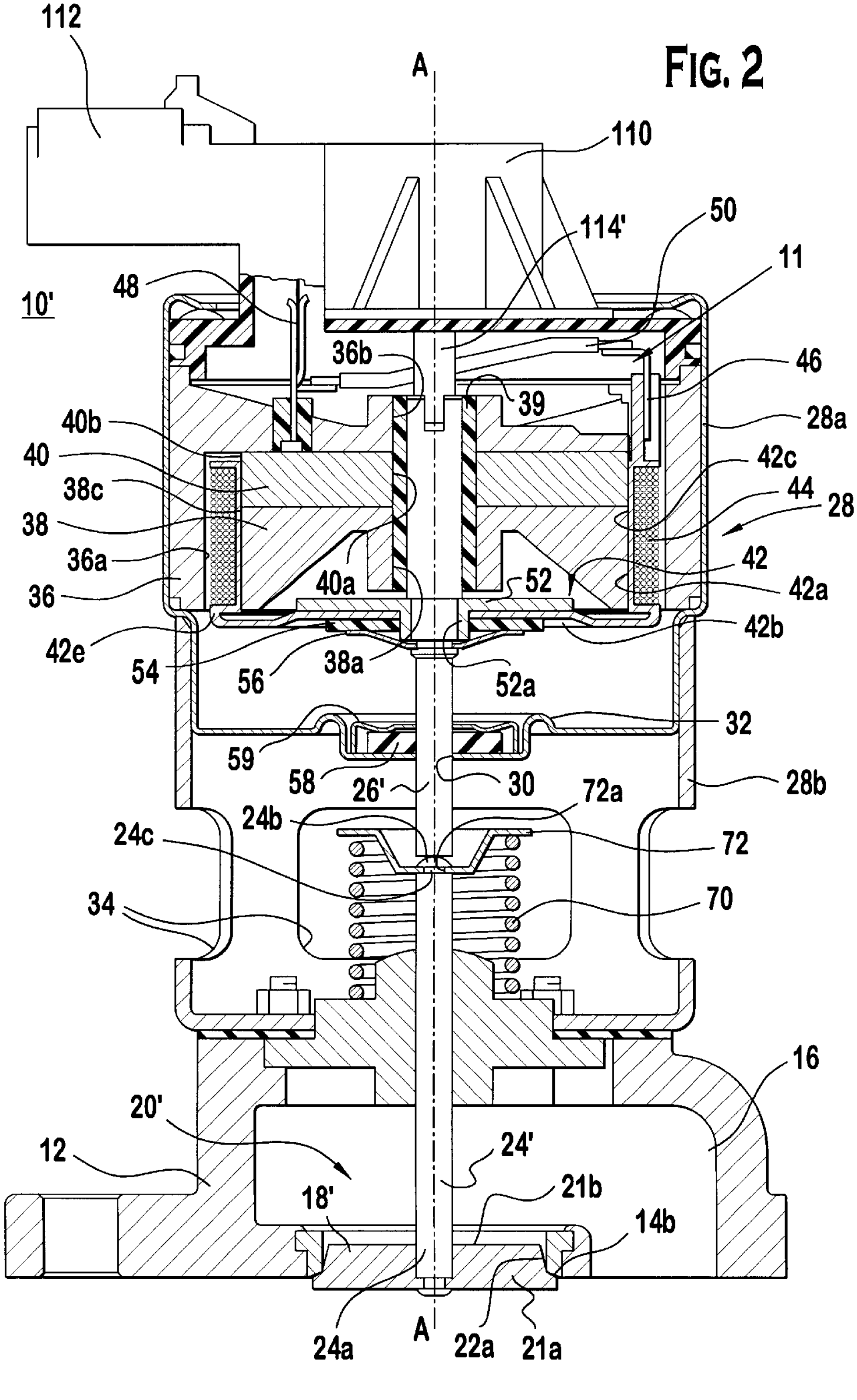
FIG. 2 illustrates another EGR valve without the force balance feature according to another preferred embodiment.

As shown in FIG. 2, the EGR valve 10' of this preferred embodiment has a housing 12 connected to an actuator casing 28 that encloses an electrical actuator 11 and provides electrical connections for the electrical actuator 11 and a position sensor 110. An internal bias spring for the follower 114' need only supply sufficient force to maintain contact between the follower 114' and the elongate member 26' in the preferred embodiment of FIG. 2. This is largely because the actuator 11 moves in an opposite direction, as compared to the actuator of the preferred embodiment of FIG. 1, to locate the head contiguous to the first port so as to inhibit flow. The housing 12 can be connected to a port of an exhaust manifold and a port of an intake manifold. The housing 12 has a first port 14 in fluid communication with a second port 16 so that exhaust gas from the exhaust manifold of an engine (not shown) can be communicated to the second port 16 and thereon to the intake manifold of the engine.

Unlike the closure member 18 of FIG. 1, the closure member or head 18' of FIG. 2 is disposed with its sealing surface 22*a* exposed to the second port 16 (i.e., intake manifold instead of exhaust manifold). A first face area 21*a* is exposed to a port of an exhaust manifold of an engine (not shown). On the other hand, a second face area 21*b* is exposed to the second port 16 or a port of an intake manifold of an engine (not shown). The head 18' is connected to a first distal end 24*a* of a valve stem 24' by a suitable fastening technique. The valve stem 24' can be coupled to an elongated member 26' of the electrical actuator 11.

The valve stem 24' is coupled at its second distal end 24*b* to a valve closing spring 70 by a stamped spring retainer 72. The second distal end 24*b* has a generally curved contour so as to permit two degrees of freedom of movement with respect to the elongated member 26' of the electrical actuator 11. The stamped spring retainer 72 has an aperture 72*a* in which the generally curved contour of the valve stem 24' can be inserted therein. An annular groove 24*c* formed proximate the second distal end 24*b* allows an e-clip (not shown) to secure the spring retainer 72 to the valve stem 24'. Preferably, the second distal end 24*b* of the valve stem 24' has a hemispherical end with an annular groove 24*c* circumscribing the valve stem 24' proximate the second distal end 24*b*.

The electrical actuator 11 of the preferred embodiments allows the valve stem 24,24' of the EGR valves 10,10' to be stroked through a minimum stroke distance of approximately 6–12 millimeters at a generally constant force through the stroke distance to move the head 20,20' to one of a plurality of positions along the longitudinal axis A—A so that the first port 14 can fluidly communicate with the second port 16 depending on engine operating conditions such as, for example, engine load, engine temperature, engine speed, or an output signal from an oxygen sensor, to name a few. The EGR valve 10,10' of the preferred embodiments can be used to infinitely vary the amount of exhaust gas being recirculated through the engine as part of an engine emission control strategy.

In operation, the head 20,20' of either embodiment is initially in a closed position so as to occlude any fluid flow between the first port 14 and second port 16 of the housing 12 during start up of the engine. From this point on, however, operation of the preferred embodiment of FIG. 1 is different from that of the preferred embodiment of FIG. 2. Therefore, the operation of each will be described separately below.

With respect to the operation of the preferred embodiment of FIG. 1, the valve 20 is maintained in its closed position prior to engine starting by action of the relatively small internal spring in the follower 114 of the position sensor 110. Upon startup of the engine, exhaust from an exhaust port of an exhaust manifold (not shown) is fluidly connected to the first port 14. The exhaust pressure flows through the at least one orifice passage 21*c* so that the chamber 66 is pressurized with exhaust gas. The exhaust gas impinges on the first face area 21 and also to the surface area of the ring seal 23*b*. Because the surface areas of these members are generally equal, the head 20 is maintained in its closed position due to exhaust pressure alone. When exhaust gas recirculation is required in an amount dictated by an engine controller, the electrical actuator 11 is controlled to position the elongated member 26 along the longitudinal axis A—A by energization of the coil 44 so that the coil 44 and portion of the bobbin assembly 42 move in the volume V radially outward of the magnetic member 40 and one of the outer and inner cores 36,38. By virtue of the coupling 60, the valve stem 24 is preferably moved at a 1:1 correspondence ratio along the longitudinal axis A—A while reducing the heat being transferred to the electrical actuator 11, thereby tending to prolong the life of the electrical actuator 11. When the coil 44 is de-energized, the balance of forces acting on the head 22 moves the valve 20 to its closed position.

Rapid energizing of the coil to its maximum rated power can also be used to clean out the chamber 66 and the at least one orifice passage 21*c* by causing the head 20 to rapidly move towards the hub portion 66*b* of chamber 66. This rapid motion pressurizes the air volume in chamber 66, which tends to dislodge deposits formed proximate the at least one passage 21*c*. Further, the rapid motion toward the electrical actuator 11 results in high velocity fluid travel through the at least one orifice 21*c* and into the chamber 66, which tends to dispel any debris or condensate that has collected in the chamber 66. This cleaning technique can be performed as part of the EGR control strategy such as, for example, prior to start up operation or after engine shut down.

With respect to the operation of the preferred embodiment of FIG. 2, the valve 20' is maintained in its closed position by action of the valve closing spring 70 prior to engine start up. Upon startup of the engine, exhaust from an exhaust port of an exhaust manifold (not shown) is fluidly connected to the first port 14. The exhaust pressure impinges on the first face area 21*a*, and in conjunction with the force of the valve closing spring 70, tends to balance the force of intake vacuum acting on the second face area 21*b* in a closed position of the valve 20'. The second face area 21*b* is preferably exposed to engine vacuum in the intake manifold (not shown). By virtue of the surface area of the first face area 21*a* being exposed to exhaust pressure, an additional force is applied to the valve 20' to ensure closure of the valve 20' during idle or during throttle-closed deceleration when engine vacuum is greatest and when exhaust gas recirculation is usually not required. This additional closing force allows a valve closing spring 70 to be smaller. FIG. 2 shows an EGR arrangement where extension of the actuator opens the valve 10' in a direction opposing the exhaust flow. The benefits of this arrangement include that the spring force required to close the valve 10' is reduced (compared to valve 10 shown in FIG. 1) as the high flow induced forces acting on the valve at idle or during throttle-closed deceleration simply help to maintain the valve 10' closed. This weaker spring force allows the use of a smaller actuator 11.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A method of controlling an exhaust gas recirculation valve in an engine, the valve having a housing including a first port communicating with an exhaust port of the engine, the first port being in fluid communication with a second port, a closure member being disposed in the housing in a closed position along a longitudinal axis occluding fluid communication between the first port and the second port and one of a plurality of positions permitting fluid communication therebetween, an electrical actuator having a first core, a magnetic member and a second core aligned along the longitudinal axis, and a bobbin assembly supporting a coil, the bobbin assembly being coupled to the closure member, the method comprising:

maintaining the closure member in the closed position upon de-energization of the coil; and moving the bobbin assembly along the longitudinal axis within a volume outside of a radial perimeter of the magnetic member with respect to the longitudinal axis so as to move the closure member along the longitudinal axis.

2. A method of assembling a bobbin assembly of an electromagnetic actuator, the electromagnetic actuator having an outer core surrounding an inner core and a magnetic member about a longitudinal axis so as to provide a generally toroidal interior volume, a bobbin assembly having a generally cylindrical portion integral to a generally planar portion, a coil being mounted to the cylindrical portion, a bushing being coupled to the inner core, the magnetic member and the outer core along the longitudinal axis, the bushing supporting and guiding an elongated member, the method comprising:

inserting a locating plate with a hub portion over the elongated member; and sandwiching the generally planar portion of the bobbin assembly to the locating plate with a retaining assembly along the longitudinal axis so that the bobbin assembly is aligned to the longitudinal axis relative to the outer core.

3. An electrical actuator comprising:

a casing having a first casing end spaced from a second end along a longitudinal axis;

an inner core proximate the first casing end, the inner core having a first circumferential surface disposed about the longitudinal axis, the inner core including a first opening disposed about the longitudinal axis;

a magnetic member proximate to the inner core, the magnetic member having a second circumferential surface disposed about the longitudinal axis and circumferentially aligned with the first circumferential surface so as to provide a generally continuous surface, the magnetic member including a second opening disposed about the longitudinal axis;

an outer core generally coaxial with respect to the inner core, the outer core extending along the longitudinal axis, the outer core including a third opening disposed about the longitudinal axis;

a bushing being disposed in the first, second and third openings along the longitudinal axis, the bushing supporting and guiding an elongated member; and a bobbin assembly being coupled to the elongated member and supporting a coil, the coil being disposed in the generally toroidal interior volume so that the coil moves in a portion of the interior volume along the longitudinal axis upon energization of the coil.

4. The electrical actuator of claim 3, wherein the outer core surrounds the first and second circumferential surface so as to form a generally toroidal interior volume.

5. A method of controlling an exhaust gas recirculation valve in an engine, the valve having a housing including a first port communicating with an exhaust port of the engine, the first port being in fluid communication with a second port, a closure member being disposed in the housing in a closed position along a longitudinal axis occluding fluid communication between the first port and the second port and one of a plurality of positions permitting fluid communication therebetween, an electrical actuator having a first core, a magnetic member and a second core aligned along the longitudinal axis, and a bobbin assembly supporting a coil, the bobbin assembly being coupled to the closure member, the method comprising:

maintaining the closure member in the closed position upon de-energization of the coil; and moving the bobbin assembly in a volume radially inward of one of the first and second cores and radially outward of the magnetic member and the other of the first and second cores along the longitudinal axis.

6. The method of claim 5, wherein the moving comprises translating the bobbin assembly towards the first port along the longitudinal axis upon energization of the coil.

7. The method of claim 5, wherein the moving comprises translating the bobbin assembly towards the outer core along the longitudinal axis upon energization of the coil.

8. An exhaust gas recirculation valve comprising:

a housing having a first port with a seat surface in fluid communication with a second port, the housing including an annular chamber disposed about a longitudinal axis and surrounding a hub portion coaxial to the longitudinal axis, the first port adapted to fluidly communicate with a port of an exhaust manifold of an engine and the second port is adapted to fluidly communicate with a port of an intake manifold of the engine;

an electrical actuator being connected to the housing;

a force balance closure assembly being disposed in the housing, the force balance closure assembly including:

a closure member being disposed in one position along a longitudinal axis to occlude fluid communication between the first port and the second port and one of a plurality of positions permitting fluid communication therebetween a stem extending through the hub of housing along the longitudinal axis so as to couple to the electrical actuator; and a head being coupled to the stem, the head having a face portion and a body portion;

the face portion including:

a sealing surface contiguous to the seat surface of the first port in the one position, the face portion including a first face area spaced from a second face area along the longitudinal axis, the first face area being exposed to the first port, the second face area being exposed to the second port; and at least one passage extending through the face portion;

and the body portion including:

a generally cylindrical body extending about the longitudinal axis from the face portion towards an end portion surrounding the hub and being surrounded by the annular chamber, the body portion forming an interior volume in fluid communication with the annular chamber and the passage; and an annular seal being disposed in an annular groove of the end portion about the longitudinal axis, the annular seal having a circumferential surface contiguous to interior wall surface of the annular chamber so that the chamber is generally fluid tight with respect to the second port as the end portion and the seal move along the longitudinal axis in the chamber.

9. The exhaust gas recirculation valve of claim 8, wherein the face portion comprises a first face area having a first surface area greater than a second surface area of the second face area and generally equal to the sealing surface area, and a force balance including a pressure in the first port tends to maintain the sealing surface of the face portion contiguous to the seat surface when the electrical actuator is de-energized thereby occluding fluid communication between the first port and the second port.

10. The exhaust gas recirculation valve of claim 9, wherein the housing comprises a bushing being disposed in the hub of chamber along the longitudinal axis so as to guide the stem of the closure member as the stem reciprocates with respect to the housing.

11. The exhaust gas recirculation valve of claim 8, wherein the at least one orifice passage comprises a passageway having an internal volume less than the interior volume of the body portion so that the at least one orifice passage dampens exhaust pressure pulsations to the chamber from the exhaust manifold.

12. An exhaust gas recirculation valve comprising:

a housing having a first port in fluid communication with a second port;

a closure member being disposed in the housing in one position along a longitudinal axis to occlude fluid communication between the first port and the second port and one of a plurality of positions permitting fluid communication therebetween;

an elongated member being coupled to the closure member; and an electrical actuator proximate the housing, the actuator including:

an inner core having a first opening disposed about the longitudinal axis;

a magnetic member adjacent the inner core, the magnetic member having a second opening disposed about the longitudinal axis;

an outer core generally coaxial with respect to the inner core, the outer core extending along the longitudinal axis and surrounding the inner core and the magnetic member so as to form a generally toroidal interior volume, the outer core including a third opening disposed about the longitudinal axis;

a bushing being disposed in the first, second and third openings of the inner core, the magnetic member and the outer core along the longitudinal axis, the bushing supporting and guiding an elongated member; and a bobbin assembly being coupled to the elongated member and supporting a coil, the coil being disposed in the generally toroidal interior volume so that the coil moves in a portion of the interior volume along the longitudinal axis upon energization of the coil.

13. The exhaust gas recirculation valve of claim 12, wherein the bobbin assembly comprises a cylindrical portion integral to a planar portion, the planar portion being sandwiched between a first disc and a second disc along the longitudinal axis so as to locate the bobbin relative to the longitudinal axis.

14. The exhaust recirculation valve of claim 12, wherein the closure member is adapted to move along the longitudinal axis towards the inner core upon energization of the coil.

15. The exhaust recirculation valve of claim 12, wherein the closure member is adapted to move along the longitudinal axis away from the inner core upon energization of the coil.

16. The exhaust recirculation valve of claim 15, wherein the closure member comprises a bias spring being fixed to the housing and coupled to the first stem end so that the bias spring biases the stem in a direction along the longitudinal axis opposite a motion of the coil when the coil is energized.

17. The exhaust recirculation valve of claim 16, wherein the head comprises a first face portion, a second face portion and a sealing surface extending between the first and second face portions along the longitudinal axis, the sealing surface contiguous to a seat surface of the first port in the one position, the first face portion being exposed to the first port, the second face portion being exposed to the second port.

18. The exhaust gas recirculation valve of claim 12, wherein the elongated member further comprises a first end being disposed in the first, second and third openings, the bobbin assembly being coupled to a portion of the elongated member, the bobbin assembly including a planar portion and a cylindrical portion.

19. The exhaust gas recirculation valve of claim 18, wherein the bobbin comprises an integrally stamped metallic alloy bobbin.

20. The exhaust gas recirculation valve of claim 19, wherein the actuator comprises a magnetic member being disposed coaxially between the inner and outer cores along the longitudinal axis.

21. The exhaust gas recirculation valve of claim 20, wherein the closure member comprises a stem extending through the housing, the stem including a first stem end and a second stem end extending along the longitudinal axis, the first stem end being coupled to the elongated member and the second stem end being fixed to a head.

22. The exhaust gas recirculation valve of claim 21, wherein the first port adapted to be in fluid communication with a port of an exhaust manifold, and the second port adapted to be in fluid communication with a port of a throttled intake manifold of the engine.

23. The exhaust gas recirculation valve of claim 21, wherein the first port adapted to fluidly communicate with a port of an exhaust manifold of an engine, and the second port adapted to be in fluid communication with a port of an intake manifold of the engine.

24. The exhaust gas recirculation valve of claim 23, wherein the actuator further comprises a position sensor coupled to the first end of the elongated member and a bias spring being disposed between the position sensor and the first end that biases the elongated member in a direction along the longitudinal axis opposite a motion of the coil when the coil is energized.

25. The exhaust gas recirculation valve of claim 21, wherein the actuator comprises an actuator casing enclosing the actuator, the actuator having a first casing end coupled to a second casing end along a longitudinal axis, the actuator casing being connected to the housing.

26. The exhaust gas recirculation valve of claim 25, further comprises a coupling that orients the elongated member with respect to the stem along the longitudinal axis, the coupling permitting two degrees of freedom between the elongated member and the stem.

27. The exhaust gas recirculation valve of claim 26, wherein the coupling comprises a first surface being spaced from a second surface and extending between a first coupling end and a second coupling end along the longitudinal axis, the first coupling end being connected to the elongated member and the second coupling end being connected to the first stem end so that the closure member is constrained to move along the longitudinal axis and permits lateral movement of either one of the closure member or the actuator relative to the longitudinal axis.

28. The exhaust gas recirculation valve of claim 27, wherein the head comprises a face portion and a body portion, the face portion having a sealing surface contiguous to a seat surface of the first port in the one position, the face portion including a first face area spaced from a second face area along the longitudinal axis, the first face area being exposed to the first port, the second face area being exposed to the second port, and at least one passage extending through the face portion.

29. The exhaust recirculation valve of claim 28, wherein the body portion comprises a generally cylindrical body extending about the longitudinal axis from the face portion towards an end portion, the body portion forming an interior volume in fluid communication with the passage.

30. The exhaust gas recirculation valve of claim 28, wherein the housing further comprises a chamber having interior wall surfaces cincturing the end portion of the body portion, the end portion having a sealing member disposed in an annular groove formed about the end portion and contiguous to the interior wall surfaces of the chamber so that the chamber is generally fluid tight with respect to the second port as the end portion moves along the longitudinal axis in the chamber.

31. The exhaust gas recirculation valve of claim 30, wherein the housing comprises a bushing being disposed in the chamber along the longitudinal axis so as to guide the stem of the closure member as the stem reciprocates with respect to the housing.

32. The exhaust gas recirculation valve of claim 30, wherein the chamber comprises a coating on at least one of the sealing surface, the interior wall surfaces and the body portion.

33. The exhaust gas recirculation valve of claim 30, wherein the sealing member comprises a sealing surface area exposed to the chamber.

34. The exhaust gas recirculation valve of claim 33, wherein the face portion comprises a first face area having a first surface area greater than a second surface area of the second face area and generally equal to the sealing surface area, and a force balance including a pressure in the first port tends to maintain the sealing surface of the face portion contiguous to the seat surface when the coil is de-energized thereby occluding fluid communication between the first port and the second port.

* * * * *